(12) United States Patent
Disney

(10) Patent No.: US 9,406,247 B2
(45) Date of Patent: Aug. 2, 2016

(54) MAGNETIC SIGN HOLDER AND SYSTEM

(71) Applicant: Chase Disney, Lenoir City, TN (US)

(72) Inventor: Chase Disney, Lenoir City, TN (US)

( * ) Notice: Subject to any disclaimer, the term of this patent is extended or adjusted under 35 U.S.C. 154(b) by 70 days.

(21) Appl. No.: 14/186,422

(22) Filed: Feb. 21, 2014

(65) Prior Publication Data

US 2014/0311000 A1  Oct. 23, 2014

Related U.S. Application Data

(60) Provisional application No. 61/810,924, filed on Apr. 11, 2013.

(51) Int. Cl.
*G09F 7/18* (2006.01)

(52) U.S. Cl.
CPC ............ *G09F 7/18* (2013.01); *G09F 2007/186* (2013.01); *G09F 2007/1852* (2013.01)

(58) Field of Classification Search
CPC ......................................................... G09F 7/18
USPC .................. 40/600, 209, 617, 618, 798, 799; 248/156
See application file for complete search history.

(56) References Cited

U.S. PATENT DOCUMENTS

| | | | |
|---|---|---|---|
| 1,395,621 A * | 11/1921 | Wheatley | 40/618 |
| 1,501,839 A * | 7/1924 | Crase | 40/209 |
| 3,990,629 A | 11/1976 | Hodge | |
| 4,703,575 A | 11/1987 | Diamond | |
| 4,741,534 A * | 5/1988 | Rogahn | 273/157 R |
| 5,383,294 A * | 1/1995 | Shen | 40/209 |
| 5,549,939 A | 8/1996 | Ray | |
| 6,550,170 B1 | 4/2003 | Cooper et al. | |
| 6,957,507 B2 | 10/2005 | Ausland et al. | |
| 6,962,460 B1 | 11/2005 | Pratt | |
| 7,319,375 B2 | 1/2008 | Roy | |
| 7,389,603 B1 * | 6/2008 | Brumfield | 40/607.05 |
| 7,843,297 B2 | 11/2010 | Fullerton et al. | |
| 7,870,687 B2 | 1/2011 | Pemberton | |
| 7,946,901 B2 * | 5/2011 | Roberts | 446/321 |
| 8,009,002 B2 | 8/2011 | Fiedler | |
| 8,234,805 B2 | 8/2012 | Dukes et al. | |
| 8,510,977 B1 * | 8/2013 | Cable | 40/611.01 |
| 2002/0152653 A1 * | 10/2002 | Shuen | 40/209 |
| 2008/0028650 A1 * | 2/2008 | Ratcliffe | 40/591 |
| 2009/0199445 A1 * | 8/2009 | Blaeser et al. | 40/600 |
| 2011/0192064 A1 * | 8/2011 | Bowman | 40/600 |
| 2012/0060398 A1 * | 3/2012 | Bowman | G09F 7/04 40/600 |
| 2012/0260549 A1 * | 10/2012 | Andrulewich | 40/745 |
| 2013/0334392 A1 * | 12/2013 | Hill | 248/500 |

* cited by examiner

*Primary Examiner* — Syed A Islam
(74) *Attorney, Agent, or Firm* — Pitts & Lake, P.C.

(57) ABSTRACT

A magnetic sign holder and system including a substantially flat accommodating portion formed of a ferromagnetic material to accommodate the magnetic sign, and one or more mounting brackets extending from one or more sides of the accommodating portion to affix the holder to a supporting member.

2 Claims, 18 Drawing Sheets

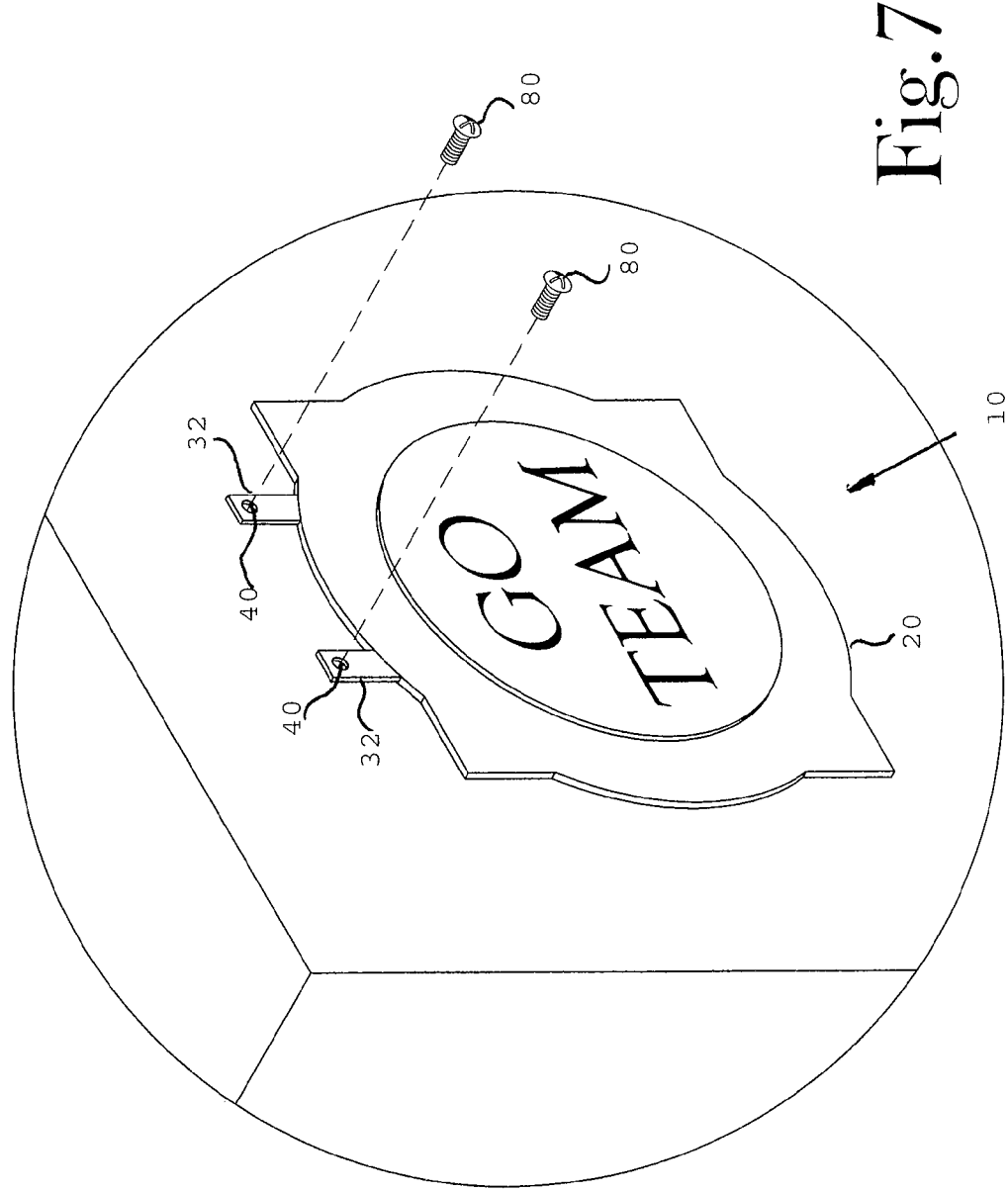

MAGNETIC SIGN HOLDER AND SYSTEM

CROSS-REFERENCE TO RELATED APPLICATIONS

This application claims priority from U.S. Provisional Application No. 61/810,924, filed on Apr. 11, 2013.

FIELD OF INVENTION

The present general inventive concept relates generally to a magnetic sign holder, and, more particularly, to a mountable metal holder and/or system which accommodates one or more readily interchangeable logo magnets.

BACKGROUND

In order to show support for various favorite sports teams, political causes, etc., people often display associated logos in the form of magnetic signs. As an example, fans of a particular professional football team may affix a team magnet decorated with that team's emblem on the back of a car during transit to and from a game, or simply throughout the season, to show support for the team. Such magnetic signs are popular, and fans often buy multiple such signs for different teams and causes.

However, some owners may wish to display these magnetic signs in a more visible way than just on the back or sides of their cars. But, as the signs are magnetic and typically need to be affixed to a metal surface, the options for mounting the signs may be somewhat limited. On a related note, more permanent, e.g., non-magnetic, team logo signs may be acquired and affixed on or near the home, but such signs are onerous to remove or change out with the changing sports seasons, or at other times during which the owner may wish to display the signs.

Therefore, a user may desire a more static accommodation on which to affix magnetic signs in an easy fashion, and one on which different magnetic signs may be readily interchanged, which would be an improvement over more permanent types of displays such as painted or otherwise permanently affixed logos, emblems, etc.

BRIEF SUMMARY

The present general inventive concept provides a magnetic sign holder on which one or more magnetic signs may be accommodated and readily exchanged, and which may be easily attached to different types of supporting members. The present general inventive concept also provides a system including the magnetic sign holder and magnetic signs, and a method of providing the magnetic signs.

Additional aspects and advantages of the present general inventive concept will be set forth in part in the description which follows, and, in part, will be obvious from the description, or may be learned by practice of the present general inventive concept.

The foregoing and/or other aspects and advantages of the present general inventive concept may be achieved by a magnetic sign holder comprising a substantially flat accommodating portion formed of a ferromagnetic material to accommodate the magnetic sign, and one or more mounting brackets extending from one or more sides of the accommodating portion to affix the holder to a supporting member.

The magnetic sign holder may include two mounting brackets extending from one side of the accommodating portion.

Each of the mounting brackets may include at least one through hole to receive a mounting screw or other adhering member.

Each of the mounting brackets may be bent approximately 90 degrees at a predetermined point between the accommodating portion and the through hole.

Each of the mounting brackets may include one or more notched portions at a location at which the mounting bracket is bent, the one or more notched portions being bent inwardly from the predetermined point having the approximately 90 degrees bend to receive a suspension member by which to hang the magnetic sign holder.

The magnetic sign holder may include one or more mounting brackets extending from each of two adjacent sides of the accommodating portion.

Each of the mounting brackets may include at least one through hole to receiving a mounting screw.

Each of the mounting brackets may be bent approximately 90 degrees at a predetermined point between the accommodating portion and the through hole.

The one or more mounting brackets may extend continuously from the accommodating portion.

The one or more mounting brackets may be fixed to the accommodating portion.

The magnetic sign holder may further include one or more decorative bodies extending from one or more sides of the accommodating portion.

The one or more decorative bodies may extend continuously from the accommodating portion.

The one or more decorative bodies may be a lace pattern.

The lace pattern may extend from two adjacent sides of the accommodating portion.

The magnetic sign holder may further include at least one bracing member extending between the mounting brackets to reduce deformation of the accommodating portion due to external forces on the accommodating portion.

At least one bracing member may be formed integrally with the mounting brackets and/or accommodating portion.

The magnetic sign holder may further include an attachable supporting member configured to be attachable to the mounting brackets and a support structure.

The attachable supporting member may be provided with through holes to receive adhering members to respectively attach the supporting member to the support structure and the mounting brackets.

The attachable supporting member may be configured as an L-shaped bracket to which the mounting brackets may be adhered to support the magnetic sign holder from above and/or below.

The foregoing and/or other aspects and advantages of the present general inventive concept may also be achieved by a magnetic sign holder system including a magnetic sign holder including a substantially flat accommodating portion formed of a ferromagnetic material to accommodate the magnetic sign, and one or more mounting brackets extending from one or more sides of the accommodating portion to couple the magnetic sign holder to a supporting member, and a mounting frame having a receiving portion to couple the magnetic sign holder to the mounting frame.

The magnetic sign holder system may also include one or more magnetic signs that are selectively adhered to the magnetic sign holder.

The magnetic signs may display one or more photographs, illustrations, alphanumeric characters, logos, and/or other indicia.

The magnetic sign holder and the mounting frame may be formed of a common material.

The mounting frame may be provided with at least one angled end to be driven into the ground.

The mounting frame may be provided with suspension members at a top side to suspend the magnetic sign holder therefrom.

The suspension members may include eyes integrated with the mounting frame, and hook members to couple the eyes of the mounting frame to the mounting brackets of the magnetic sign holder.

A top portion of the mounting frame may be supported by a single side portion.

The mounting frame may be provided with one or more anchoring portions extending from a bottom of the single side portion to anchor the mounting frame in the ground or other foundation.

A push member may be provided proximate to a bottom of the single side portion such that a user may apply force to the push member to drive anchoring portions into the ground.

One or more anchoring portions may be provided to the push member to anchor the mounting frame in the ground or other foundation.

The foregoing and/or other aspects and advantages of the present general inventive concept may also be achieved by a method of producing a personalized magnetic sign, the method including displaying a user interface to be used by a user to personalize a magnetic sign, acquiring an image desired by a user to be provided on a magnetic sign, and applying the image to the magnetic sign.

The user interface may be provided through an online website.

The user interface may be provided at a local display.

The image may include information from one or more images scanned at the local display.

The image may include digital data uploaded by the user.

The image may include one or more photographs, illustrations, alphanumeric characters, logos, or any combination thereof.

The method may further include displaying one or more previously stored photographs, illustrations, alphanumeric characters, logos, or any combination thereof that a user may choose to include in the personalized magnetic sign.

The foregoing and/or other aspects and advantages of the present general inventive concept may also be achieved by a magnetic sign system including a magnetic sign formed of a ferromagnetic material and having a fixed design thereon, and a plurality of ferromagnetic indicia to be selectively applied to and removed from the magnetic sign to customize the magnetic sign.

The magnetic sign system may further include a magnetic sign holder having a substantially flat accommodating portion formed of a ferromagnetic material to accommodate the magnetic sign, and one or more mounting members extending from one or more sides of the accommodating portion to affix the magnetic sign holder to a supporting body.

The ferromagnetic indicia may include one or more photographs, illustrations, alphanumeric characters, logos, or any combination thereof.

A first side of the magnetic sign may be provided with a first fixed design thereon, and a second side of the magnetic sign is provided with a second fixed design thereon.

The fixed design may include one or more designated areas to feature the ferromagnetic indicia.

The foregoing and/or other aspects and advantages of the present general inventive concept may also be achieved by a magnetic sign including a base layer of ferromagnetic material having a fixed design provided on at least one side, and a transparent covering, adhered to the at least one side of the base layer having the fixed design, configured to receive and support temporary markings made by a marking instrument.

The transparent covering may include one or more plastic and/or polycarbonate materials.

The transparent covering may include polyethylene, polyvinyl, polypropylene, polyvinyl actetate, polyvinyl chloride, or any combination thereof.

At least a portion of the fixed design may be provided with delineated areas designating corresponding areas of the transparent covering to be illustrated with the temporary markings.

The delineated areas may include indicators corresponding to one or more preferred colors to be used for the respective delineated areas.

Other features and aspects may be apparent from the following detailed description, the drawings, and the claims.

BRIEF DESCRIPTION OF THE FIGURES

The following example embodiments are representative of example techniques and structures designed to carry out the objects of the present general inventive concept, but the present general inventive concept is not limited to these example embodiments. In the accompanying drawings and illustrations, the sizes and relative sizes, shapes, and qualities of lines, entities, and regions may be exaggerated for clarity. A wide variety of additional embodiments will be more readily understood and appreciated through the following detailed description of the example embodiments, with reference to the accompanying drawings in which:

FIG. 7 illustrates an example use of a magnetic sign holder having the mounting brackets illustrated in FIG. 3B according to an embodiment of the present general inventive concept;

DETAILED DESCRIPTION

Reference will now be made to various example embodiments of the present general inventive concept, examples of which are illustrated in the accompanying drawings and illustrations. The example embodiments are described herein in order to explain the present general inventive concept by referring to the figures.

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The described progression of processing operations described are merely examples, however, and the sequence of operations is not limited to that set forth herein and may be changed as is known in the art, with the exception of operations necessarily occurring in a certain order. Also, description of well-known functions and constructions may be omitted for increased clarity and conciseness.

Various example embodiments of the present general inventive concept, as described herein, provide a magnetic sign holder which may be attached to a supporting member, and which may also be used as a supporting member in some example embodiments, and upon which magnetic signs may be readily attached and detached. Thus, users having various magnetic signs displaying sports team emblems, logos, holiday greetings, etc., may attach and detach and change out the magnetic signs in a ready fashion as often as they wish. Instead of a relatively more permanent sign, such as a painted one, a user may apply a magnetic sign having a favorite college team's logo on Saturday, exchange the sign for one having a favorite professional team's logo on Sunday, and exchange that sign for one having holiday greetings or the like on Monday. Alternatively, the user may leave a magnetic sign up for an extended period.

There are many different types of signs that a user may wish to display, and those signs may include illustrations, photos, words, or any combination thereof. For instance, users may want to display the aforementioned sports team logos, with either national or regional connections. A user may want to display seasonal greetings for holidays such as Christmas, Easter, Independence Day, and so on. A user may want to display personalized signs including photos and/or names of family members or pets. A user may wish to announce special occasions with the magnetic signs, such as births, birthday greetings, the gender of a newborn, and so on.

In various example embodiments described below, the illustrations, pictures, and/or text displayed on the magnetic signs may be generally referred to as indicia.

Figure 1:
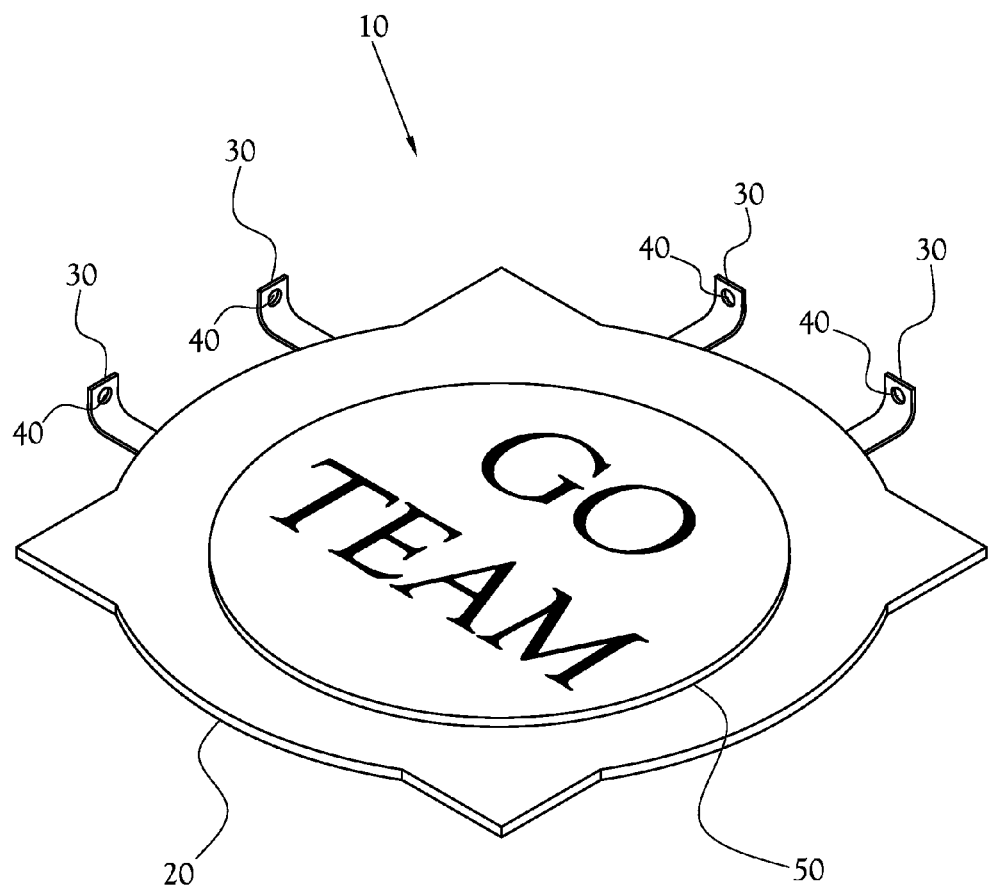
FIG. 1 illustrates a magnetic sign holder according to an example embodiment of the present general inventive concept.

FIG. 1 illustrates a magnetic sign holder according to an example embodiment of the present general inventive concept. The magnetic sign holder 10 in the example of FIG. 1 includes a substantially flat accommodating portion 20, and four mounting brackets 30 extending from two adjacent sides of the accommodating portion 20 to affix the holder to a supporting member. It is noted that the circle on square pattern of the accommodating portion 20 illustrated in FIG. 1 is merely one example of the many possible designs of the accommodating portion 20. Similarly, though the example magnetic sign holder 10 of FIG. 1 includes four mounting brackets 30, various other example embodiments may have one or more mounting brackets extending from one or more sides of the magnetic sign holder. For example, as will be described later, the magnetic sign holder 10 may only include two mounting brackets extending from one side. Also, the configuration of the one or more brackets may vary according to other various example embodiments of the present general inventive concept.

A magnetic sign 50 is illustrated as being attached to the magnetic sign holder 10, and maintains adherence to the sign holder 10 through magnetic properties.

According to various example embodiments, the accommodating portion 20 may be formed of any of various ferromagnetic materials such as, for example, iron, nickel, cobalt, alloys of such metals, such as steel, alloys that combine a transition metal selected from the group consisting of iron, nickel, and cobalt with at least one other material selected from the group consisting of boron, carbon, silicon, phosphorus, aluminum, magnesium, manganese, bismuth, antimony, arsenic, gallium, germanium, and so on. It is noted that the list of materials above is not exhaustive, and that the accommodating portion 20 merely needs to possess ferromagnetic properties such that a magnetic sign will adhere to the accommodating portion 20. In some example embodiments, a rigid ferromagnetic metal may be utilized to provide sufficient rigidity to enable the sign holder to provide support for another body attached above, below, or to one or more sides of the sign holder, or to provide support for another body resting upon the sign holder.

In the example embodiment illustrated in FIG. 1, the mounting brackets 30 each include at least one through hole 40 to receive a mounting screw (not illustrated) or other such attachment members. Also, the mounting brackets 30 illustrated in FIG. 1 are bent approximately 90 degrees at a predetermined point between the accommodating portion 20 and the through hole 40. Such a configuration allows the mounting brackets 30 to either receive or provide support to an attached member. Both possibilities are illustrated in FIG. 2, which illustrates an example use of the magnetic sign holder illustrated in FIG. 1.

Figure 2:
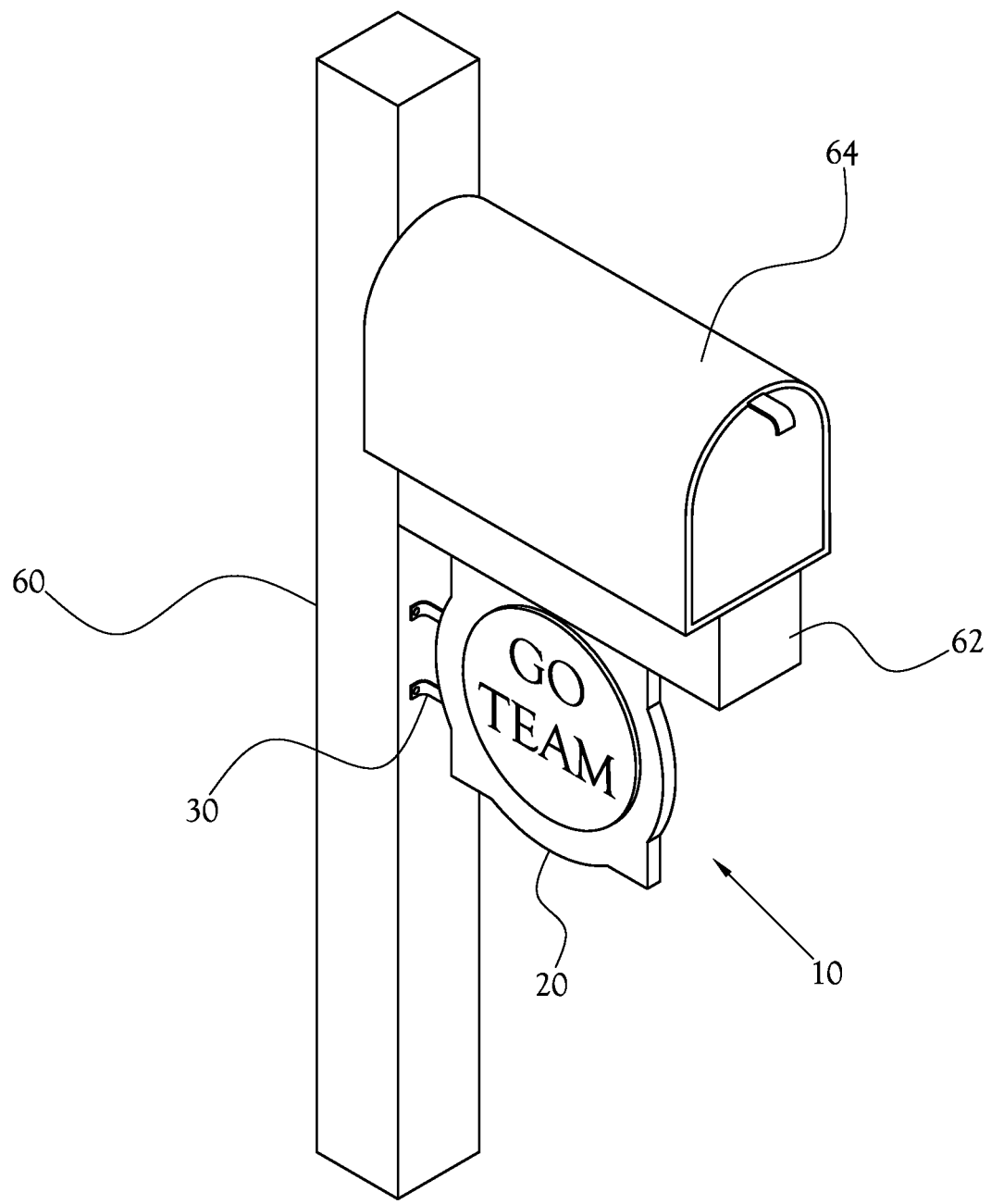
FIG. 2 illustrates an example use of the magnetic sign holder illustrated in FIG. 1.

In the example embodiment illustrated in FIG. 2, the magnetic sign holder 20 is attached to a mailbox post 60 by mounting screws (not shown) which have been screwed into the mailbox post 60 through the through holes 40 of the mounting brackets 30 adjacent to the mailbox post 60. The cantilever 62 upon which the mailbox 64 is supported is itself supported by the magnetic sign holder 10. More particularly, the magnetic sign holder 10 is attached to the cantilever 62 by mounting screws (not shown) which have been screwed into the cantilever 62 through the through holes 40 of the mounting brackets 30 adjacent to the cantilever 62, and the rigidity of the magnetic sign holder 10 provides support to the cantilever 62. More detail of this arrangement is illustrated in FIG.

5A, which will be described later. Also, due to the bent portion of the mounting brackets 30, a portion of the mounting brackets 30 past the bend may provide support to the cantilever 62 without being attached by mounting screws or other means. In other example embodiments, the magnetic sign holder 10 may provide support for the cantilever 62 without mounting brackets 30 being provided to the upper portion of the accommodating portion 20, since the rigidity of the ferromagnetic material allows cantilever 62 to merely rest upon the top portion of the magnetic sign holder 10. In other words, according to various example embodiments of the present general inventive concept, the ferromagnetic material which forms the magnetic sign holder 10 is of a rigid enough structure to bear weight rested upon the magnetic sign holder 10, or fixed thereto, and in some cases may operate similar to a cantilever type support.

Figure 3B:
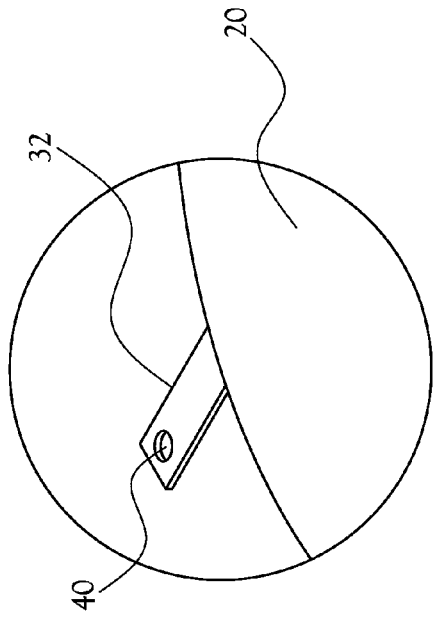
FIGS. 3A-3C illustrate various mounting bracket configurations for the magnetic sign holder according to example embodiments of the present general inventive concept.
Figure 3C:
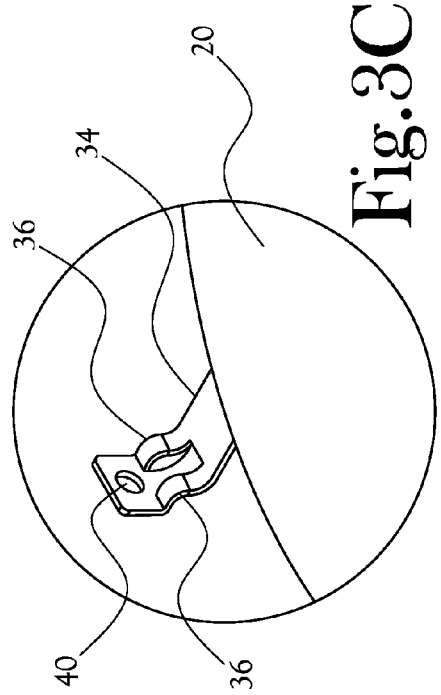
Figure 3A:
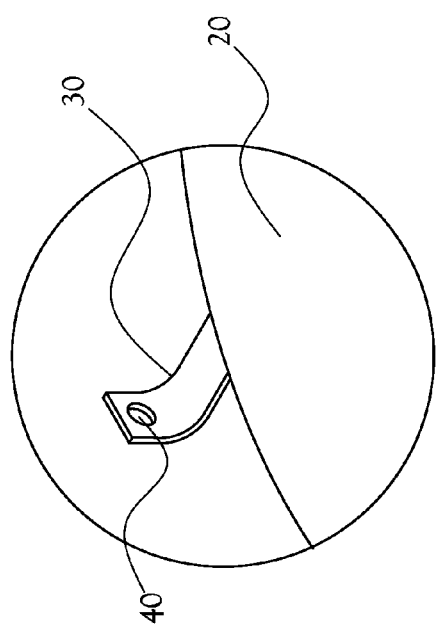

FIGS. 3A-3C illustrate various mounting bracket configurations for the magnetic sign holder 10 according to example embodiments of the present general inventive concept. FIG. 3A illustrates the mounting bracket 30 previously described in relation to FIG. 1, in which the mounting bracket 30 is bent approximately 90 degrees at a predetermined point between the accommodating portion 20 and the through hole 40. FIG. 3B illustrates a mounting bracket 32 that is not bent, and is rather configured as a straight tab for which the through hole 40 is approximately parallel with the accommodating portion 20 of the magnetic sign holder 10.

FIG. 3C illustrates a mounting bracket 34 similar in structure to the mounting bracket 30 of FIG. 3A, except for two notched portions 36 at a location at which the mounting bracket 34 is bent. The notched portions 36 are bent inwardly from the overall angle, which may be approximately 90 degrees, made by the bend in the mounting bracket 34. As the notched portions 36 are bent inwardly and partially separated from the bend of the mounting bracket 34, an opening is provided which may receive a suspension member by which to hang the magnetic sign holder, as illustrated in FIG. 4.

Figure 4:
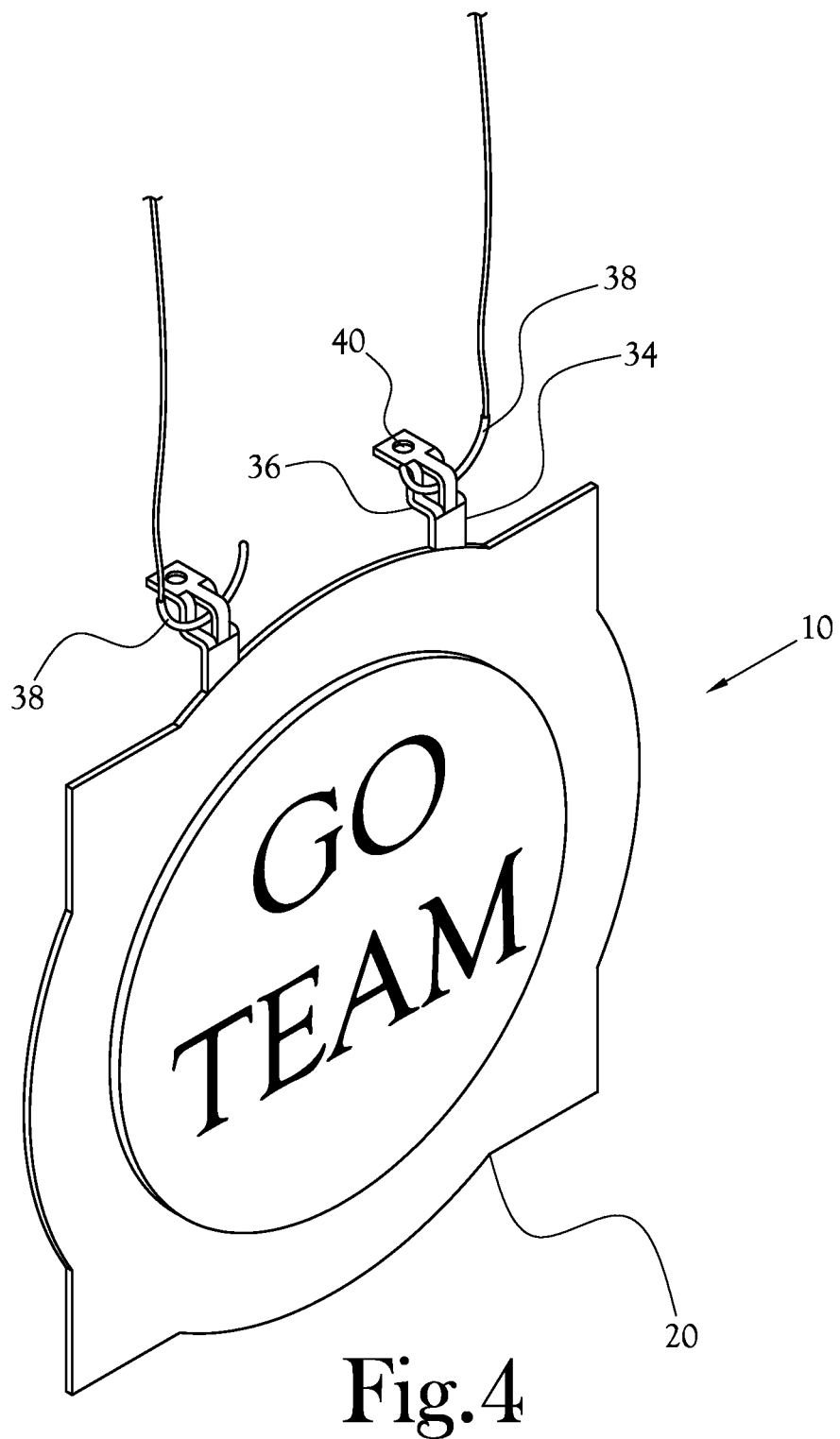
FIG. 4 illustrates an example use of a magnetic sign holder having the mounting brackets illustrated in FIG. 3C according to an embodiment of the present general inventive concept.

FIG. 4 illustrates an example use of a magnetic sign holder 10 having the mounting brackets 34 illustrated in FIG. 3C, according to an embodiment of the present general inventive concept. As illustrated in FIG. 4, the magnetic sign holder 10 is suspended by two hooks 38, rather than being mounted to a supporting body via the through holes 40. The hooks 38 pass through the opening formed by the notched portions 36, and the magnetic sign holder 10 is supported in an approximately vertical fashion due to the hooks being accommodated so closely to the portions of the mounting brackets 34 that are parallel to the accommodating portion 20.

Figure 5C:
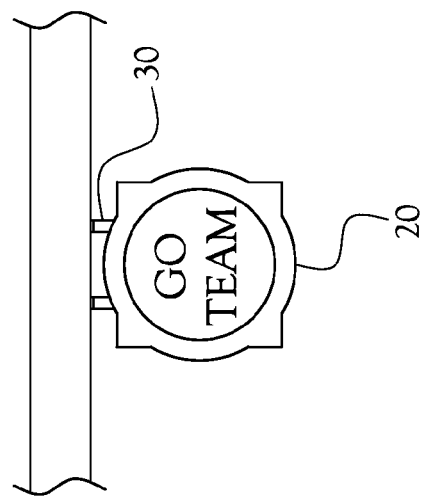
FIGS. 5A-5E illustrate various example uses of magnetic sign holders according to example embodiments of the present general inventive concept.
Figure 5B:
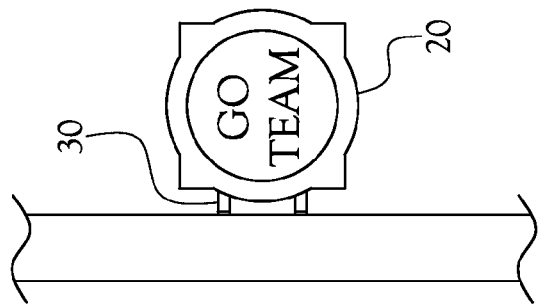
Figure 5A:
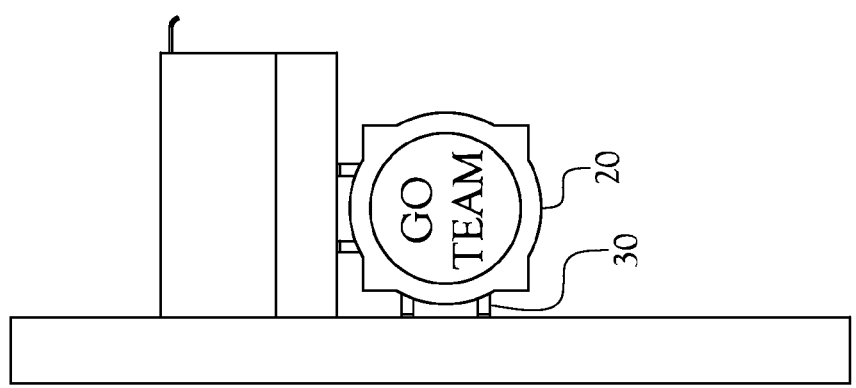

FIGS. 5A-5E illustrate various example uses of magnetic sign holders according to example embodiments of the present general inventive concept. FIG. 5A is another view illustrating the mounting configuration illustrated in FIG. 2, in which mounting brackets 30 are provided on adjacent sides of the accommodating portion 20 both to provide support to the magnetic sign holder 10 due to the attachment to the mailbox post, and also to provide support to the cantilever supporting the mailbox through the attachment of the magnetic sign holder 10 to the cantilever. Also, as previously described, the top of the magnetic sign holder 10 does not necessarily have to be attached to the cantilever to provide support, as the cantilever may simply rest upon the top mounting brackets 30 or upon the magnetic sign holder 10 itself. Although two mounting brackets are illustrated as being provided on various sides of the magnetic sign holders 10 in these examples, one or three or more mounting brackets 30 may be provided in other various examples of the present general inventive concept.

FIG. 5B illustrates a magnetic sign holder 10 in which mounting brackets 30 have only been provided to one side of the accommodating portion 20, the mounting brackets being attached to a supporting member such as a post. FIG. 5C illustrates a different orientation of the magnetic sign holder 10 illustrated in FIG. 5B, in which the mounting brackets 30 have been attached to a supporting member above the magnetic sign holder 10. In this example embodiment, the appearance of the magnetic sign holder does not change according to the example embodiments illustrated in FIGS. 5B-5C, due to the symmetrical shape of the accommodating portion 20. However, the present general inventive concept is not limited to such a symmetrical configuration. For example, FIG. 5D illustrates a magnetic sign holder similar to the one illustrated in FIG. 5A, except the accommodating portion 20 is provided with a decorative body 70 along adjacent sides of the accommodating portion which are not provided with mounting brackets 30. In this example embodiment, the decorative body is provided in a lace pattern. However, several different decorative patterns 70 may be provided to the magnetic sign holder, and may be provided on one or three or four sides. Additionally, the decorative patterns 70 may vary on different sides of the magnetic sign holder.

Figure 5E:
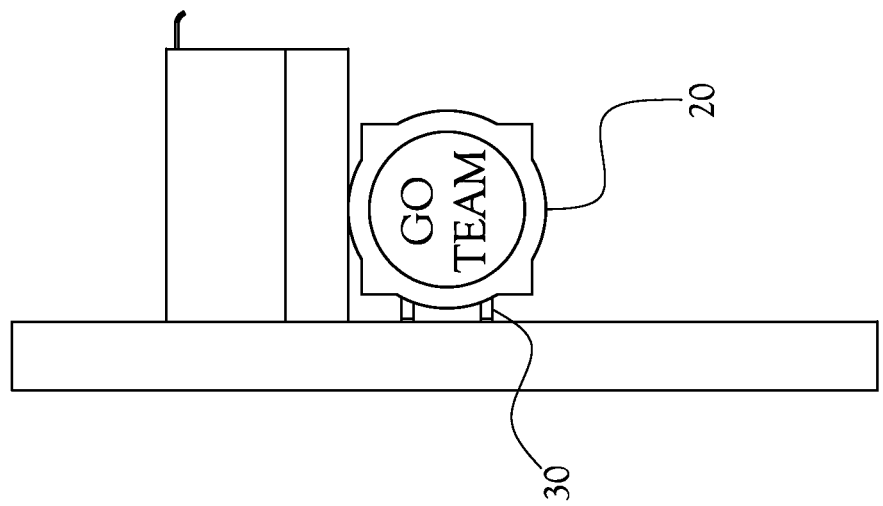
Figure 5D:
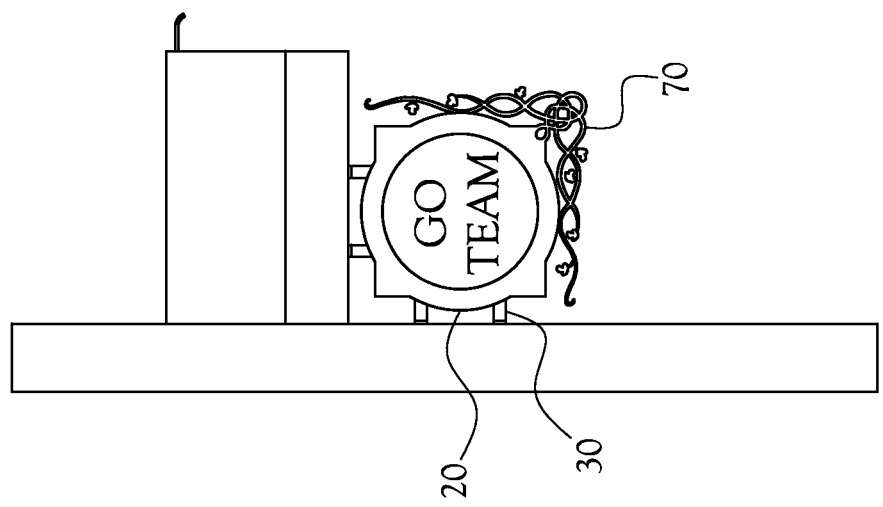

FIG. 5E illustrates an example embodiment of the magnetic sign holder 10 in which the mounting brackets 30 are provided on only one side of the accommodating portion 20, and a mailbox-supporting cantilever is supported by simply resting on a top side of the accommodating portion 20 of the magnetic sign holder 10. It is noted that various directional adjectives such as "top" are used solely in reference to the illustrated configurations in these drawings, as the actual top side of the magnetic sign holder may depend on various example mounting configurations.

Figure 6A:
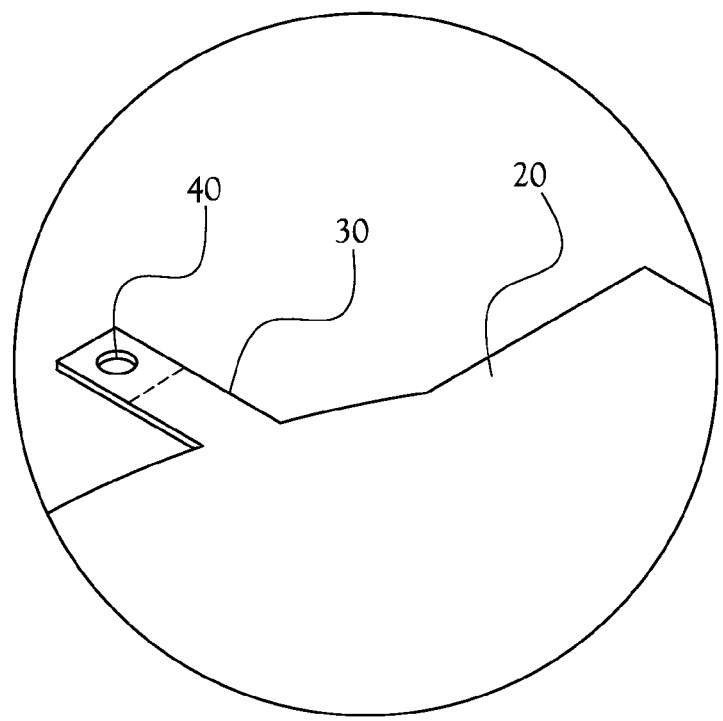
FIGS. 6A-6B illustrate an example formation of the bracket 30 of FIG. 1 is formed according to the present general inventive concept.
Figure 6B:
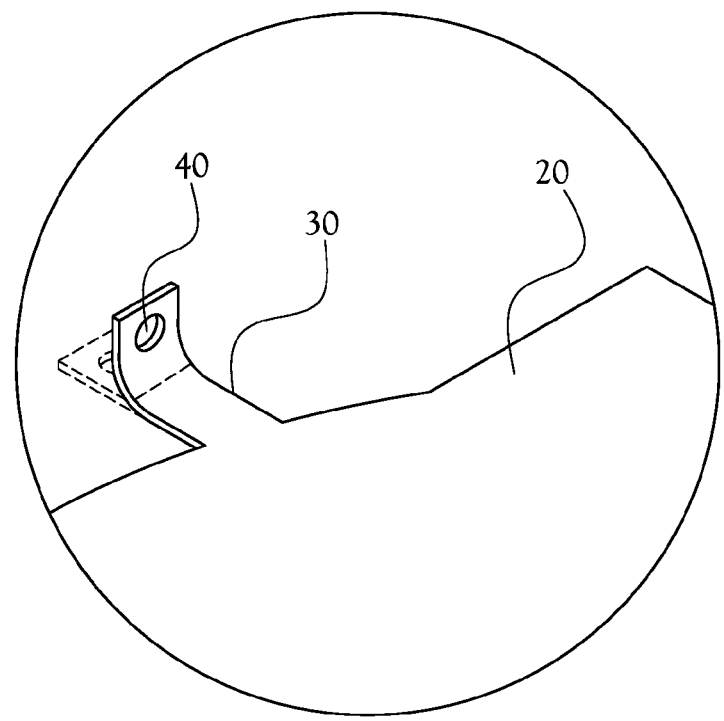

FIGS. 6A-6B illustrate an example formation of the bracket 30 of FIG. 1 is formed according to the present general inventive concept. In this example, as in FIG. 1A, a pattern has been punched, cut, etc., from a single piece of ferromagnetic metal, and the pattern includes both the accommodating portion 20 and the one or more mounting brackets 30. The process also includes the forming of the through hole 40 at a distal end of the respective one or more mounting brackets 30. In FIG. 6B, after the production of the pattern including the accommodating portion 20 and bracket 30 of FIG. 6A, the bracket 30 portion is bent by any of several known production methods such that an angle of approximately 90 degrees is formed at a predetermined point between the accommodating portion 20 and the through hole 40. It is noted, however, that this is simply one example embodiment of the present general inventive concept, and various other example embodiments may include mounting brackets that are attached to the accommodating portion 20 after the formation of the accommodating portion 20, by various attachment processes such as welding and so on.

Figure 18:
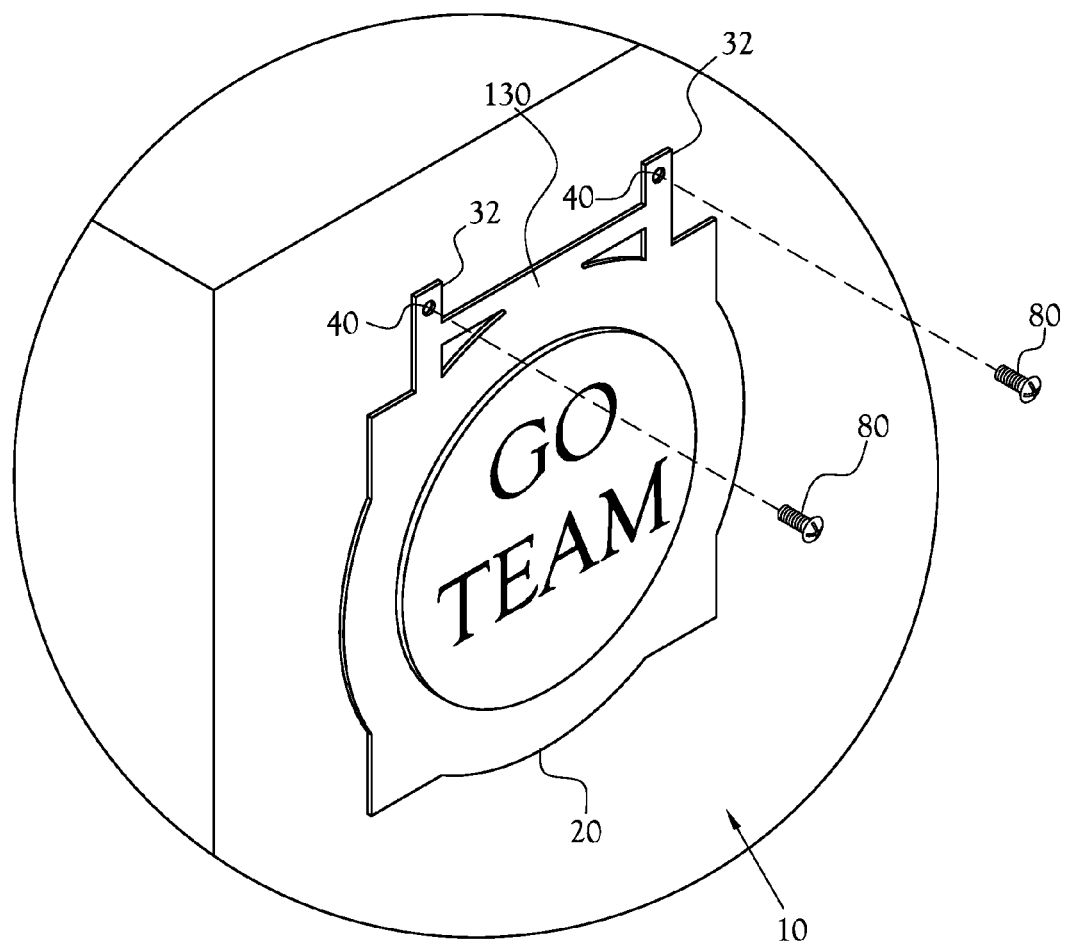
FIG. 18 illustrates an example use of the magnetic sign holder having the mounting brackets illustrated in FIG. 3B and the bracing member illustrated in FIG. 13, according to an embodiment of the present general inventive concept.

FIG. 7 illustrates an example use of a magnetic sign holder 10 having the mounting brackets illustrated in FIG. 3B according to an embodiment of the present general inventive concept. In this example, as in FIG. 1A, a pattern has been punched, cut, etc., from a single piece of ferromagnetic metal, and the pattern includes both the accommodating portion 20 and two flat mounting brackets 32, e.g., configured as straight tabs for which the corresponding through holes 40 are approximately parallel with the accommodating portion 20 of the magnetic sign holder 10. With various example embodiments such as the one illustrated in FIG. 7, the magnetic sign holder 10 may be mounted, for example, to a wall or other flat surface with screws 80 so that the user may display the magnetic sign of his/her choice. The user may choose to attach the magnetic sign holder 10 to an interior wall of the home, an exterior wall, or any similar flat surface. Also, it is understood that the screws 80 used to mount the magnetic sign holder 10 in this example are merely one way to attach the magnetic sign holder 10 to a surface, and various other methods and/or devices to adhere the magnetic sign holder 10 to a surface may be used within the scope of the present general inventive concept. For example, this same example embodiment may be mounted with nails, hooks, etc. As seen in FIG. 18, the magnetic sign holder 10 can be provided with a bracing member 130 between the two flat mounting brackets 32.

Figure 8:
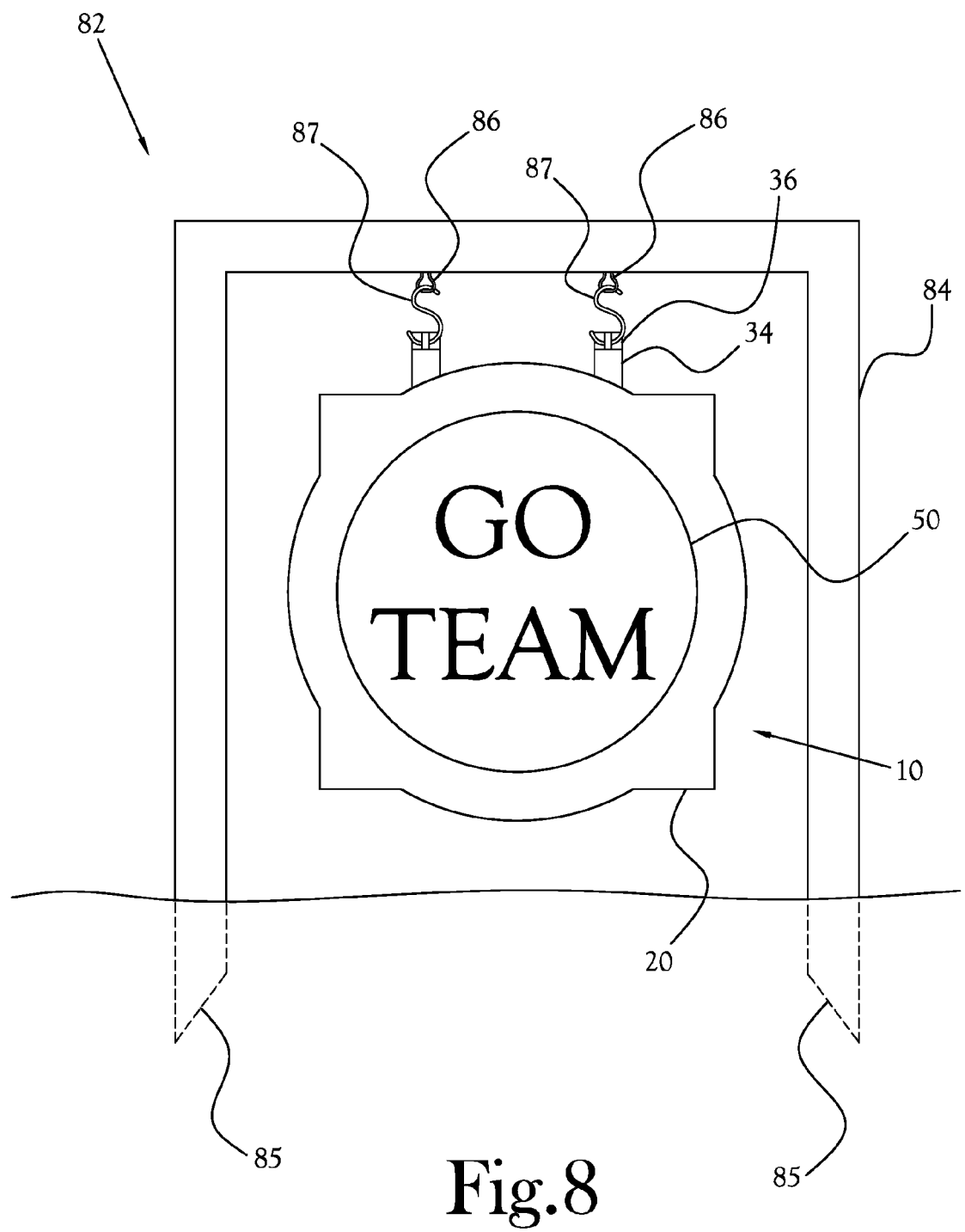
FIG. 8 illustrates a magnetic sign holder system including a mounting frame according to an embodiment of the present general inventive concept.

FIG. 8 illustrates a magnetic sign holder system including a mounting frame according to an embodiment of the present general inventive concept. The magnetic sign holder system 82 includes a magnetic sign holder 10 coupled to a mounting frame 84. The mounting frame 84 illustrated in this example embodiment serves only to support the magnetic sign holder 10, but in various other example embodiments the mounting frame 84 may be formed of a rigid and sturdy enough material to also provide support for bodies placed above, to the side, etc., or to secure other bodies, such as, for example, a dog chain. The mounting frame 84 illustrated in FIG. 8 is a substantially U-shaped frame having angled ends 85 to make driving the mounting frame 84 into the ground, or other such base, more convenient for the user. Thus, the user may use a hammer, mallet, or similar implement to drive the mounting frame 84 into the ground before suspending the magnetic sign holder 10 to the mounting frame 84. It is understood that the configuration of the mounting frame 84 illustrated in FIG. 8 is merely one possible type of mounting frame, and various other example embodiments of the present general inventive concept may provide any number of configurations and different shapes from which to suspend, or to which to mount, the magnetic sign holder 10. In various example embodiments, the mounting frame 84 may be formed of the same rigid material as is the magnetic sign holder 10. Various example embodiments of the mounting frame 84 may also include one or more push members (not shown) extending from the mounting frame 84 that a user may use to push the angled ends 85 into the ground. For example, in various example embodiments, one or more such push members may extend from one or more sides of the mounting frame 84 such that a user may step onto the push members to sink the angled ends 85 to the desired depth, which may leave the push members substantially flush with the ground or other base into which the mounting frame 84 is being driven.

The mounting frame 84 may be provided with one or more suspension members 86 from which to suspend the magnetic sign holder 10. In the example embodiment illustrated in FIG. 8, the suspension members 86 are loops, or eyes, through which a respective first end of one or more s-hooks 87 may pass to suspend the magnetic sign holder 10 from the mounting frame 84. The magnetic sign may be provided with mounting brackets 34 as illustrated in FIGS. 3C-4, and a respective second end of the one or more s-hooks 87 may pass through the opening formed by the notched portions 36 provided in the mounting brackets 34. In other words, as previously described, as the notched portions 36 are bent inwardly and partially separated from the bend of the mounting bracket 34, an opening is provided which may receive a suspension member, which in this example embodiment is an s-hook 87. It is understood that the s-hook 87 and eye 86 suspension arrangement illustrated in FIG. 8 is merely one example of how the magnetic sign holder 10 may be coupled to the mounting frame 84, and various other configurations and styles may be incorporated or substituted. With the configuration illustrated in FIG. 8, the user can easily slip the magnetic sign holder 10 off of the s-hooks 87 to more easily change out the magnetic sign 50. In other various example embodiments, the mounting frame 84 may be provided with hooks which may be received by the holes 40 in the brackets 32 illustrated in FIG. 3B. In some example embodiments, magnetic signs 50 may be provided on both sides of the magnetic sign holder 10. Such magnetic sign systems incorporating the mounting frame may be used in a garden, as a grave marker, to secure a pet chain, or any other of a variety of uses.

As previously described, the magnetic signs 50 may be used for a variety of different occasions, themes, etc. "Do-it-yourself" kits including various customizable magnetic bodies may be provided, so that a user can form and/or customize the magnetic sign to be displayed. For example, magnetic letters may be provided to display the score of a recent game over a sports logo, or to write a name of a family or other person(s) on a seasonal greeting display. The magnetic signs 50 may even be customized at a manufacturing point so that personal photos are formed on the sign itself to be displayed. According to one example embodiment, a printing device capable of printing photos, illustrations, and/or text on the magnetic signs 50 may be provided at a business location, and a customer may simply bring a photo which will be converted to a printable image that is printed on the magnetic sign 50 while the customer waits. For example, such a device may be provided at a kiosk in a building supply store, and the customer may be provided with a customer interface and scanner that allows the customer to customize the magnetic sign 50 him/herself, and have the customized magnetic sign 50 within a matter of minutes. The customer may utilize an integrated scanner to scan the desired image, or may upload a digital file of the desired image. In other various example embodiments, a customer may order such a customized magnetic sign 50 through an online connection with the world wide web.

Figure 9:
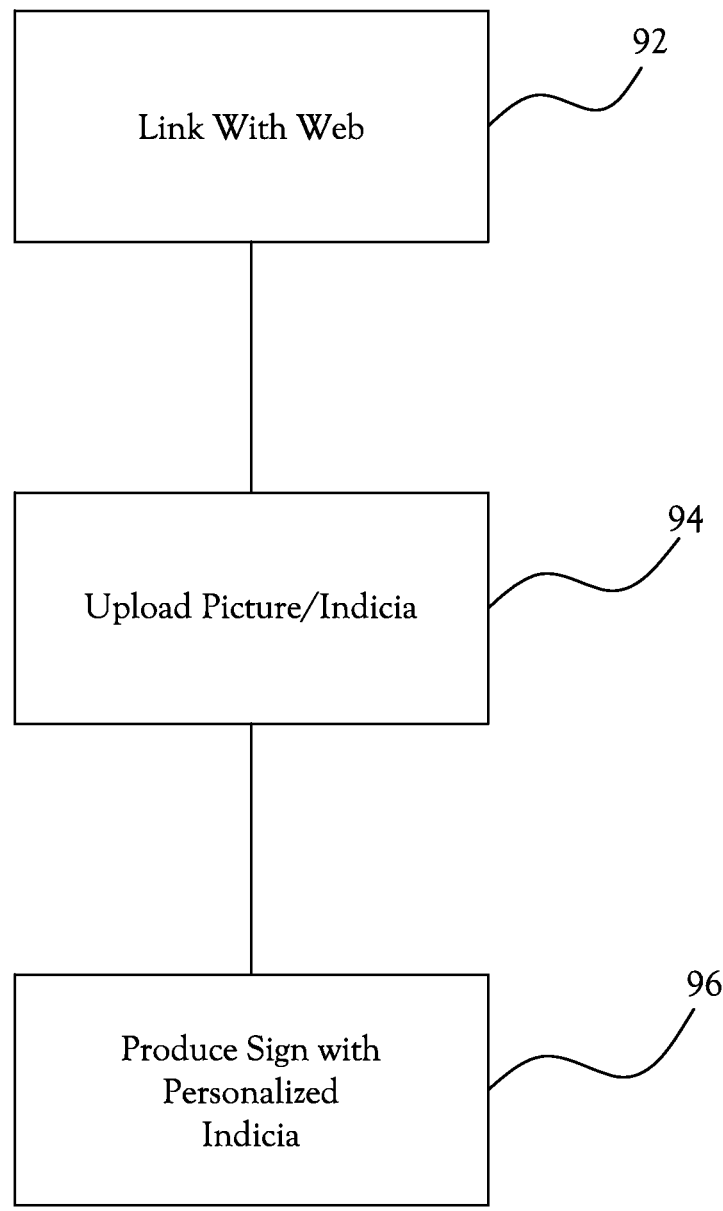
FIG. 9 is a flow chart illustrating a method of providing a magnetic sign according to an embodiment of the present general inventive concept.

FIG. 9 is a flow chart illustrating a method of providing a magnetic sign according to an embodiment of the present general inventive concept. In operation 92 a user may interact with an online website of a business entity that will provide and/or produce the customized magnetic sign. The website may provide a customer interface that allows the customer to select the quantity of signs to be supplied, various shapes, and so on, as well as any image the customer wishes to be printed on the magnetic sign. In operation 94, the user may upload a digital image of the photo or other desired indicia to be printed or otherwise provided on the magnetic sign. In various example embodiments, the user may be able to see an illustration of the design placed on the sign, and may be given options to move or re-size the image, or further customize the image with graphics, lettering, and so on. In operation 96, the personalized indicia finalized by the user through the customer interface will be printed or otherwise provided on the magnetic sign, which may then be shipped to the user, or otherwise provided for pickup by the user at a designated place.

Figure 10:
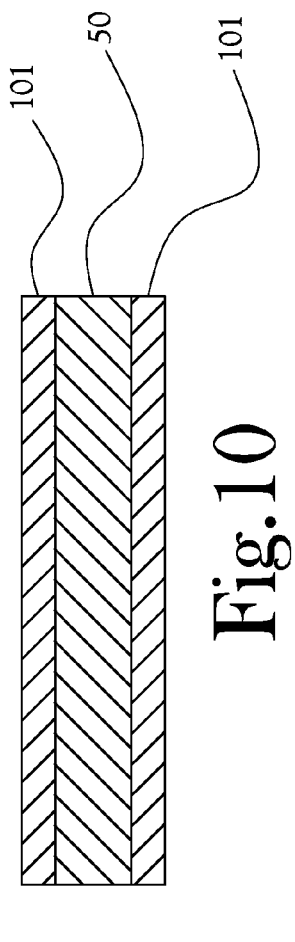
FIG. 10 illustrates a partial cross-section of a magnetic sign according to an example embodiment of the present general inventive concept.

The magnetic signs 50 used in, and produced for, the magnetic sign holder may be configured for various types of customizing according to the user's preferences. FIG. 10 illustrates a partial cross-section of a magnetic sign according to an example embodiment of the present general inventive concept. The magnetic sign 50 of FIG. 10 is provided with a transparent covering 101 that may be used to further customize the magnetic sign 50 in a permanent and/or temporary fashion. For example, the covering 101 may be a type of laminate that allows for markings made by a marking instrument, such as coloring with crayons, magic markers, etc., that may be easily wiped away, or otherwise erased, when the user wishes to change the customized portion of the sign. The transparent covering 101 may be fabricated from or include one or more of a variety of plastic or polycarbonate materials, including, but not limited to, polyethylene, polyvinyl, polypropylene, polyvinyl acetate, polyvinyl chloride, or a number of other synthetic polymers. In the example embodiment illustrated in FIG. 10, the transparent covering 101 is provided on both sides of the magnetic sign 50, but in some example embodiments the covering 101 may only be provided on one side of the magnetic sign 50. In various example embodiments, the transparent covering 101 may be formed on the magnetic sign 50 during the manufacturing process, or may be provided after manufacturing, such as with a transparent adhesive.

In example embodiments in which the magnetic sign 50 is provided with the transparent covering 101, one or more areas of the magnetic sign 50 may be left relatively plain so that the corresponding area of the transparent covering 101 may be decorated with various writing, coloring, etc., tools. Such a configuration increases the convenience of the user in customizing the magnetic sign 50 for weekly games, party announcement times, and so on, since the writing/illustration can simply be wiped off with any of a number of erasers, cleaners, etc. The magnetic sign 50 may also be provided with the permanent decoration and transparent covering 101 on both sides, so that the magnetic sign 50 is reversible on the magnetic sign holder 10.

Figure 11:
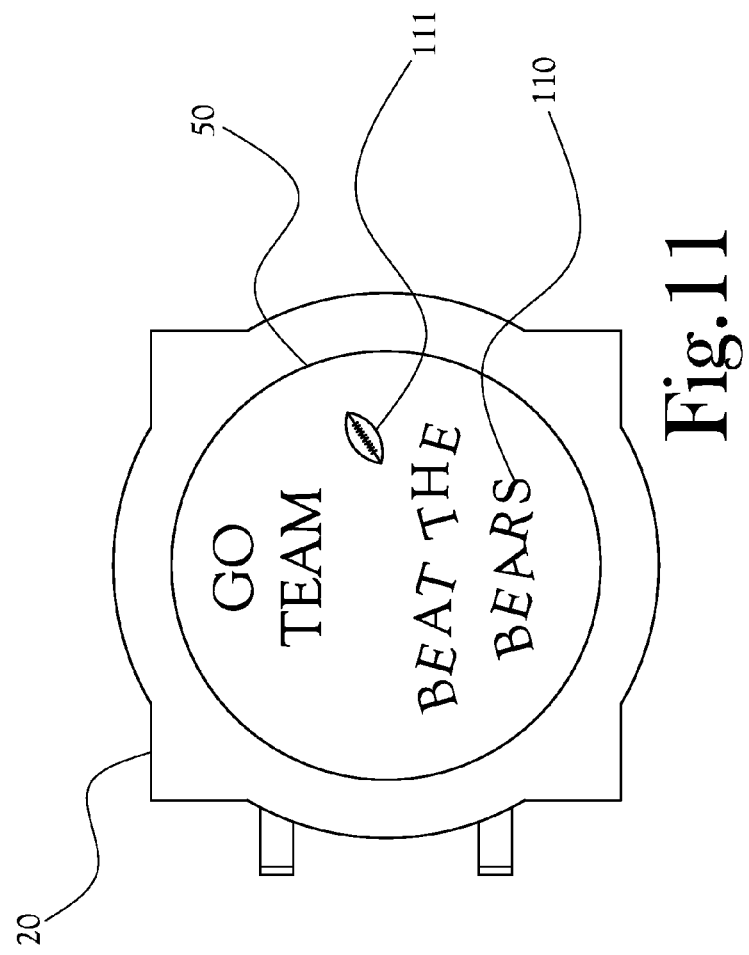
FIG. 11 illustrates a magnetic sign according to another example embodiment of the present general inventive concept.

FIG. 11 illustrates a magnetic sign according to another example embodiment of the present general inventive concept. In the example embodiment illustrated in FIG. 11, the magnetic sign 50 is provided with additional magnetic indicia 110 and 111, such as photographs, illustrations, alphanumeric characters, logos, etc., that may be applied to the magnetic sign to customize the appearance according to the user's preferences. For example, in the example embodiment illustrated in FIG. 11, a number of individual magnetic letters 110 have been configured to spell "BEAT THE BEARS" to show support for the user's team for the upcoming game. A magnetic representation of a football 111 has also been applied to the sign to further signify the sport which is being alluded to by the other magnetic letters 110. As shown by this drawing, any number of alphanumeric characters and other symbols, logos, etc., may be used to show support for athletic teams, make holiday/family announcements, and so on. Further, various example embodiments of the magnetic sign 50 may also be provided with the transparent covering 101, which may be configured to be sufficiently thin to allow the magnetic indicia 110,111 to adhere to the magnetic sign 50. The magnetic indicia 110,111 may also be stackable on one another to allow further customizing options. In other example embodiments, the indicia 110,111 used to customize the sign may have adhesive qualities other than magnetism, and may be re-usable. For example, the indicia 110,111 may be die-cut vinyl sheet images which stick to the transparent covering 101 through the adhesion that takes place when two highly polished surfaces come in contact with one another. Also, the indicia 110,111 may include a luminescent material, such as, for example, a phosphorescent coating, so that the indicia 110,111 "glow in the dark." The luminescent material may also be incorporated into the fixed illustrations of the magnetic sign 50.

Figure 12:
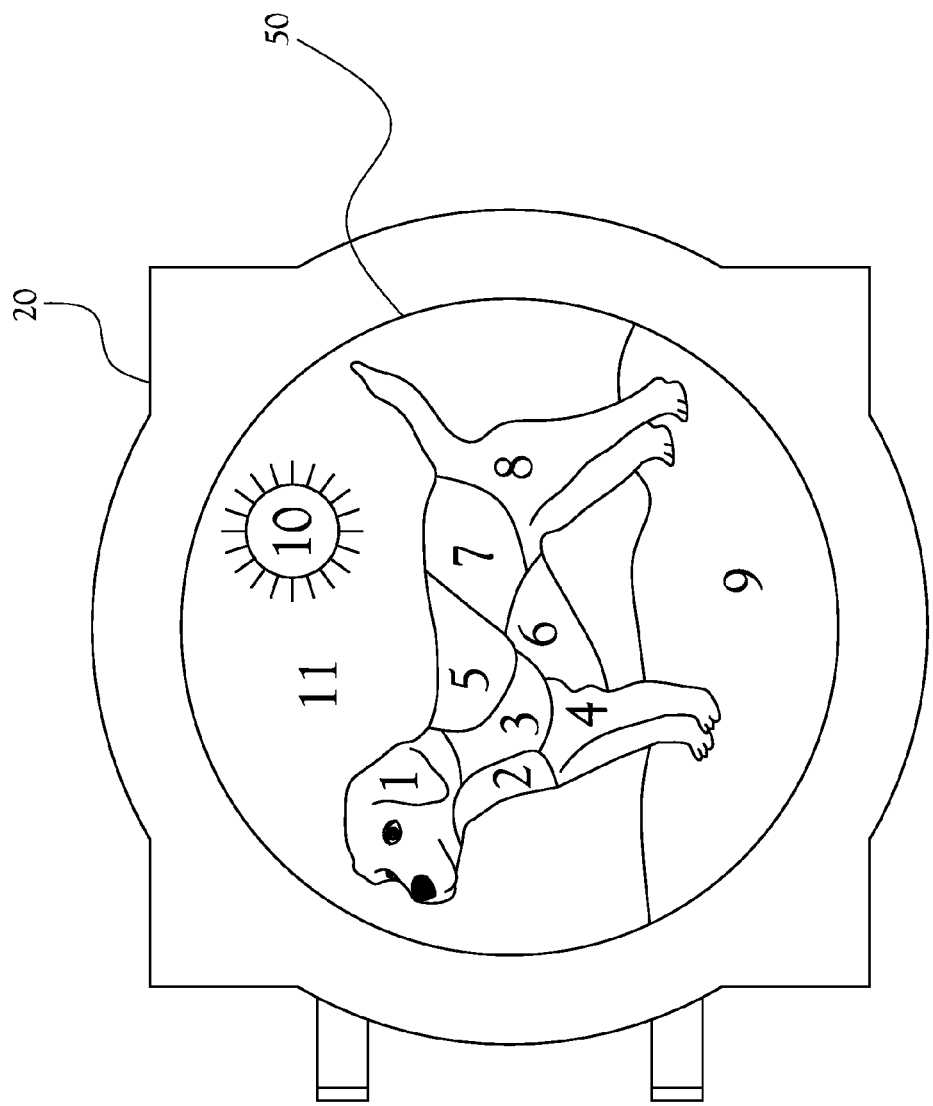
FIG. 12 illustrates a magnetic sign according to yet another example embodiment of the present general inventive concept.

FIG. 12 illustrates a magnetic sign according to yet another example embodiment of the present general inventive concept. In the example embodiment of FIG. 12, the permanent illustration provided on the magnetic sign 50 is a black and white illustration that is arranged with different areas to be colored by the user. As indicated in FIG. 12, different areas of the illustration have borders indicating the end of the respective coloring areas, and further have numbers which correspond to specific colors that may be provided in an illustration kit, or may simply be detailed in instructions that may be used with user supplied crayons, markers, etc. The magnetic sign 50 may be provided with the transparent covering 101 illustrated in FIG. 10 so that the decoration of the magnetic sign 50 may be wiped away and redecorated as desired. In various example embodiments, all of the permanent illustration of the magnetic sign 50 may be provided in black and white to be decorated by the user, and in other various example embodiments only one or more portions of the magnetic sign 50 may be provided in such a manner. Also, the color by numbers markings may or may not be provided, according to the various example embodiments.

Figure 13:
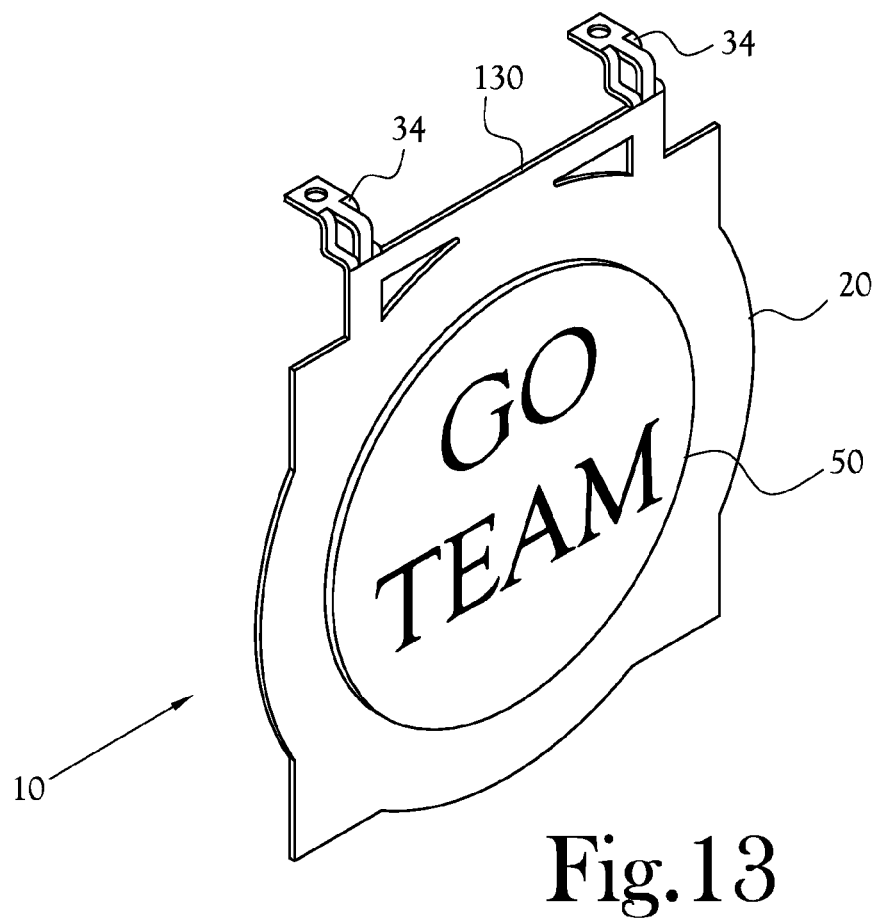
FIG. 13 illustrates a magnetic sign holder according to another example embodiment of the present general inventive concept.

FIG. 13 illustrates a magnetic sign holder according to another example embodiment of the present general inventive concept. In the example embodiment illustrated in FIG. 13, the magnetic sign holder 10 is provided with a bracing member 130 to provide support that helps reduce flexing of the magnetic sign holder 10 due to, for example, wind or other conditions. In the example illustrated in FIG. 13, the bracing member 130 is provided to only one side of the magnetic sign holder 10, that being the side provided with the mounting brackets 34. However, other example embodiments may provide a bracing member 130 to two or more sides, or any side with mounting brackets, etc. Also, the example embodiment illustrated in FIG. 13 illustrates the notched mounting brackets 34 being provided to the magnetic sign holder 10, but the any type of mounting brackets may be incorporated with the bracing member 130. Further, although the bracing member 130 of this example embodiment is illustrated as being formed with the body of the magnetic sign holder 10, in other various example embodiments the bracing member 130 may only extend between the mounting brackets themselves. In various example embodiments, the bracing member 130 may or may not be formed of the same material as the magnetic sign holder 10 and/or mounting brackets 34. Similarly, in various example embodiments the bracing member 130 may be formed separately and attached to the mounting brackets 34 and/or sign holder 10 by various types of attachment, rather than being formed integrally with the mounting brackets 34 and sign holder 10 as is the embodiment illustrated in FIG. 13.

Figure 14:
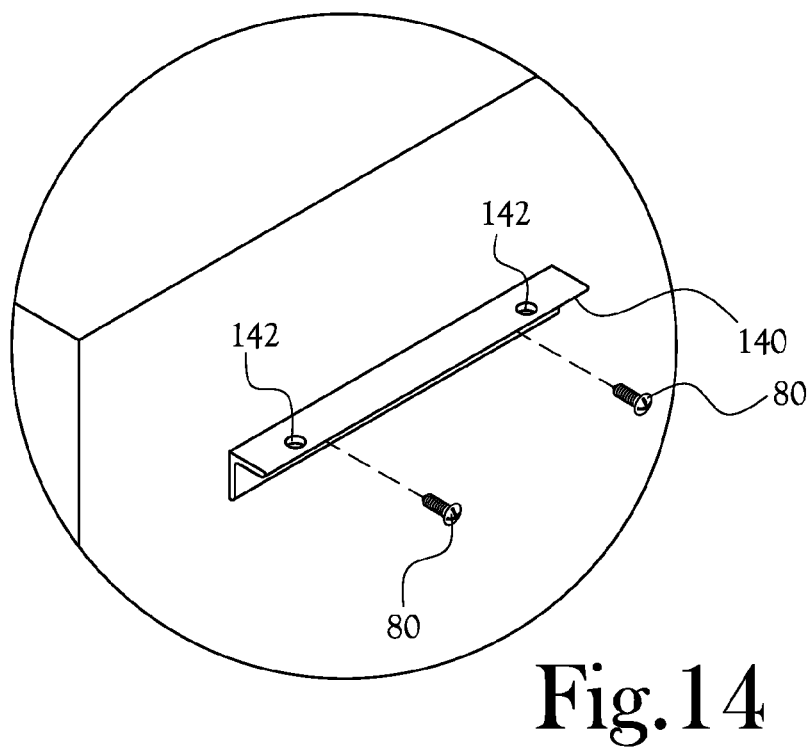
FIGS. 14-16 illustrate a magnetic sign holder system including an attachable supporting member according to an example embodiment of the present general inventive concept.
Figure 16:
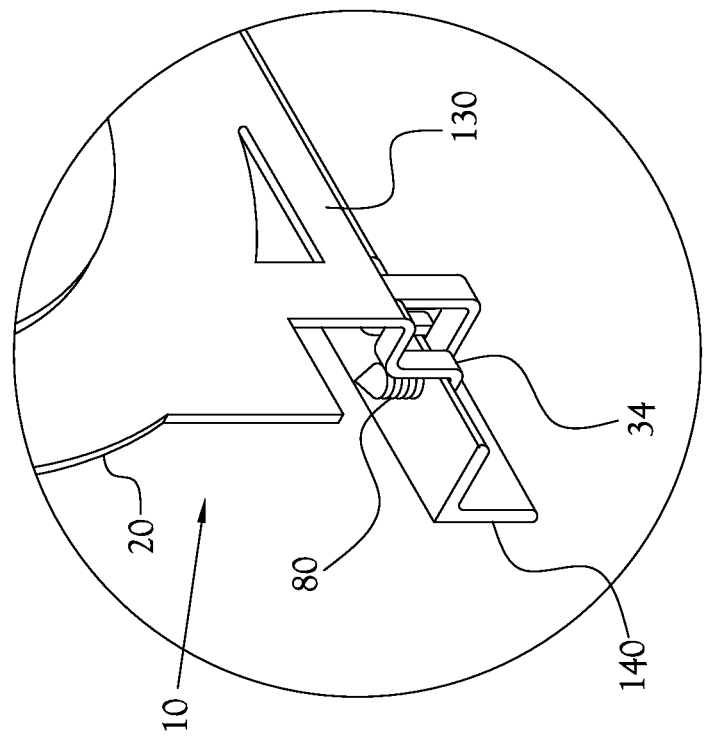
Figure 15:
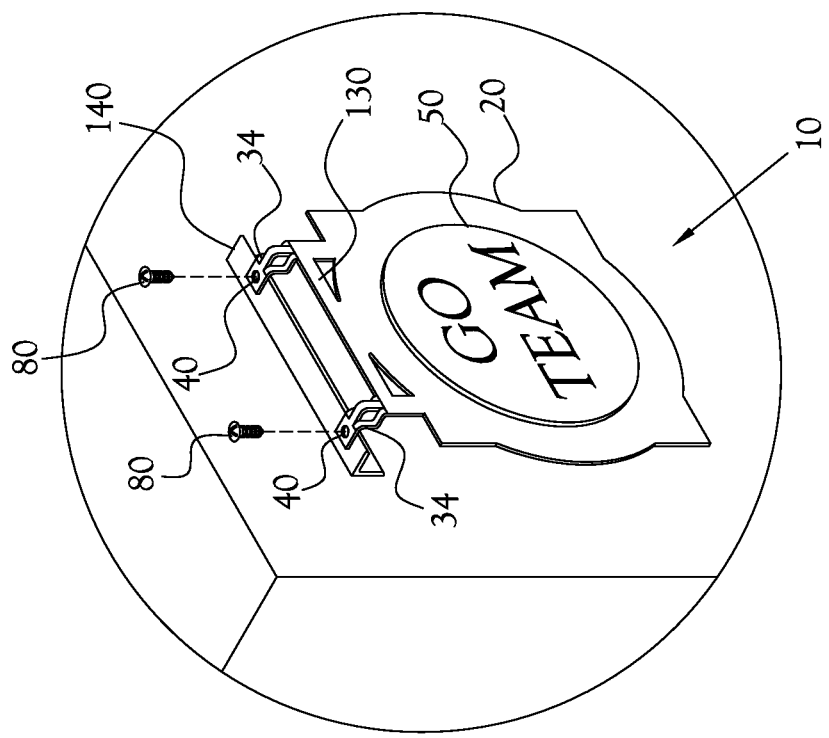

FIGS. 14-16 illustrate a magnetic sign holder system including an attachable supporting member according to an example embodiment of the present general inventive concept. FIG. 14 illustrates the attachable supporting member 140, which in this example embodiment is an L-shaped bracket with through holes 142 provided on either side. It is understood that other various example embodiments of the present general inventive concept may provide attachable supporting members with different shapes and configurations. It is also noted that the attachable supporting member 140 is not to be confused with the more generally described supporting member in various others of these descriptions, which may refer to a structure such as a wall, a mounting frame, etc. In the example embodiment illustrated in FIG. 14, the attachable supporting member 140 is configured to be affixed to a wall by screws 80 or any of several other types of adhering members, such as nails, etc., which may be applied through the through holes 142 adjacent to the wall (not shown). The remaining through holes 142 may be used in conjunction with the through holes 40 provided to the mounting brackets 34 of the magnetic sign holder 10. As illustrated in FIGS. 15-16, due to the rigidity of the supporting member 140 of this example embodiment, the magnetic sign holder 10 may be configured to be suspended from the supporting member 140, or to be mounted above the supporting member 140.

FIG. 15 illustrates the magnetic sign holder 10 as being suspended from the supporting member 140. As illustrated in FIG. 15, the through holes 40 of the mounting brackets 34 are aligned with the through holes 142 of the supporting member 140, and the screws 80 may be inserted through the paired through holes to secure the sign holder 10 to the supporting member 140. Although the mounting brackets 34 are shown to be provided above the top surface of the supporting member 34, the mounting brackets 34 may be coupled to the supporting member 140 from the underside of the supporting member as well. Similarly, FIG. 16 illustrates the magnetic sign holder 10 as being mounted above the supporting member 140, with the screws 80 similarly inserted through the paired through holes 40 and 142. As in FIG. 15, the mounting configuration illustrated in FIG. 16 may be applied to the top or bottom surface of the outwardly extending portion of the supporting member 140. It is understood that although the notched mounting brackets 34 are illustrated as being coupled to the supporting member 140, various other types of mounting brackets, such as the brackets previously discussed in these descriptions, may be used with the supporting member 140.

Figure 17:
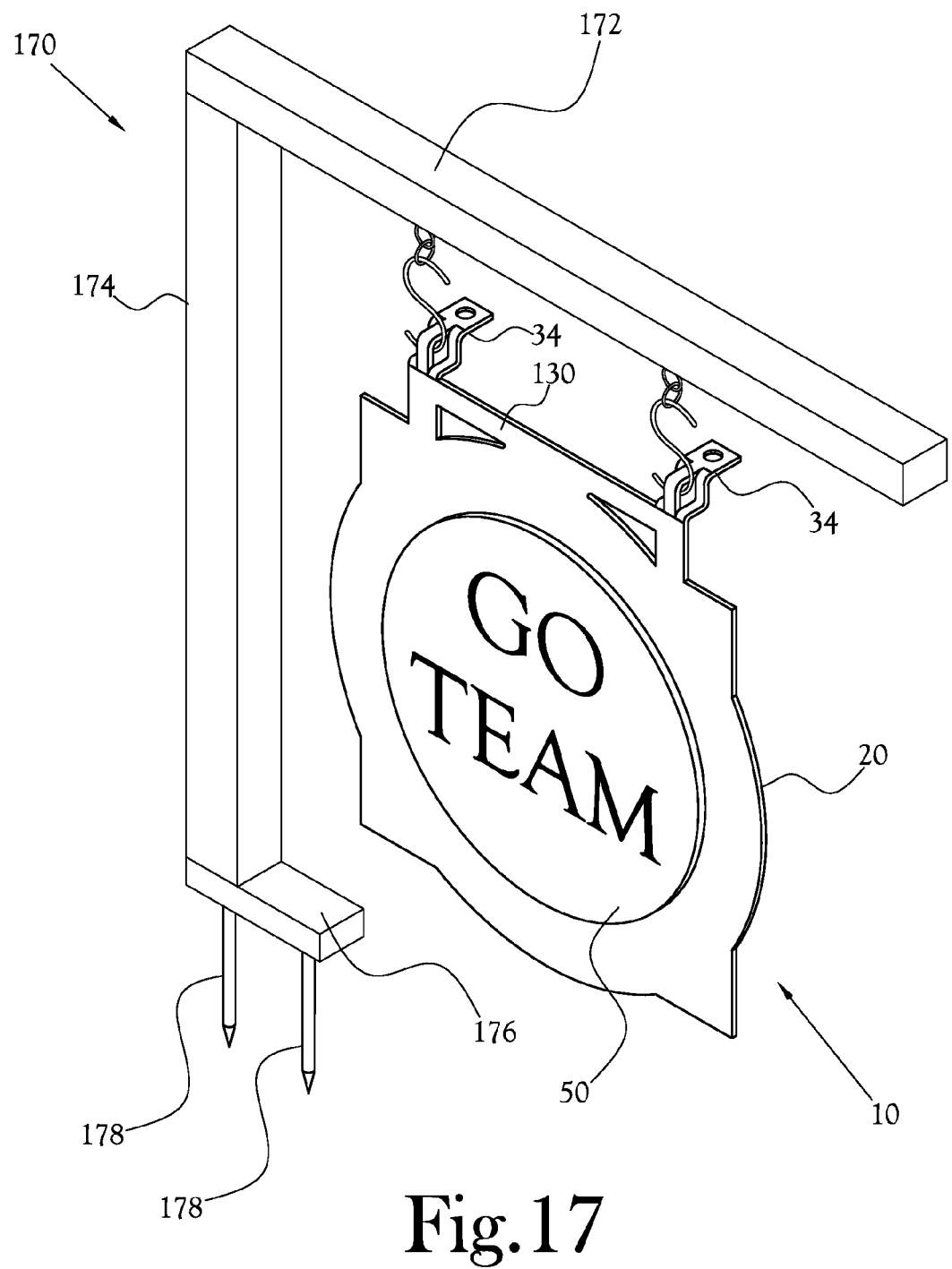
FIG. 17 illustrates a magnetic sign holder system including a mounting frame according to another example embodiment of the present general inventive concept.

FIG. 17 illustrates a magnetic sign holder system including a mounting frame according to another example embodiment of the present general inventive concept. The magnetic sign holder system in this example embodiment includes a magnetic sign holder 10 coupled to a mounting frame 170 in a similar fashion to the example embodiment illustrated in FIG. 8, but a top portion 172 of the mounting frame 170 illustrated in FIG. 17 is supported by a single side portion 174. Such a configuration may provide a more desirable appearance to some users. A base portion 176 may be provided at the bottom of the side portion 174 to provide a place for the user to step and apply force to drive one or more anchoring portions 178, such as spikes or the like, into the ground or other foundation on which the mounting frame 170 is being mounted. A plurality of the anchoring portions 178 may be provided so that the magnetic sign holder system does not move around an axis due to wind or other forces. Various other example embodiments may provide the one or more anchoring portions 178 directly to the bottom of the side portion 174, without the base portion 176 being provided. The anchoring portions 178 may be formed of the same material as the mounting frame 170, and may be formed integrally as part of the mounting frame 170. In other various example embodiments, the anchoring portions 178 may be formed of a different material and/or attached to the mounting frame 170. In still other various example embodiments, the single side portion 174 may simply be provided with an angled end such as those provided to the example embodiment illustrated in FIG. 8.

Figure 19A:
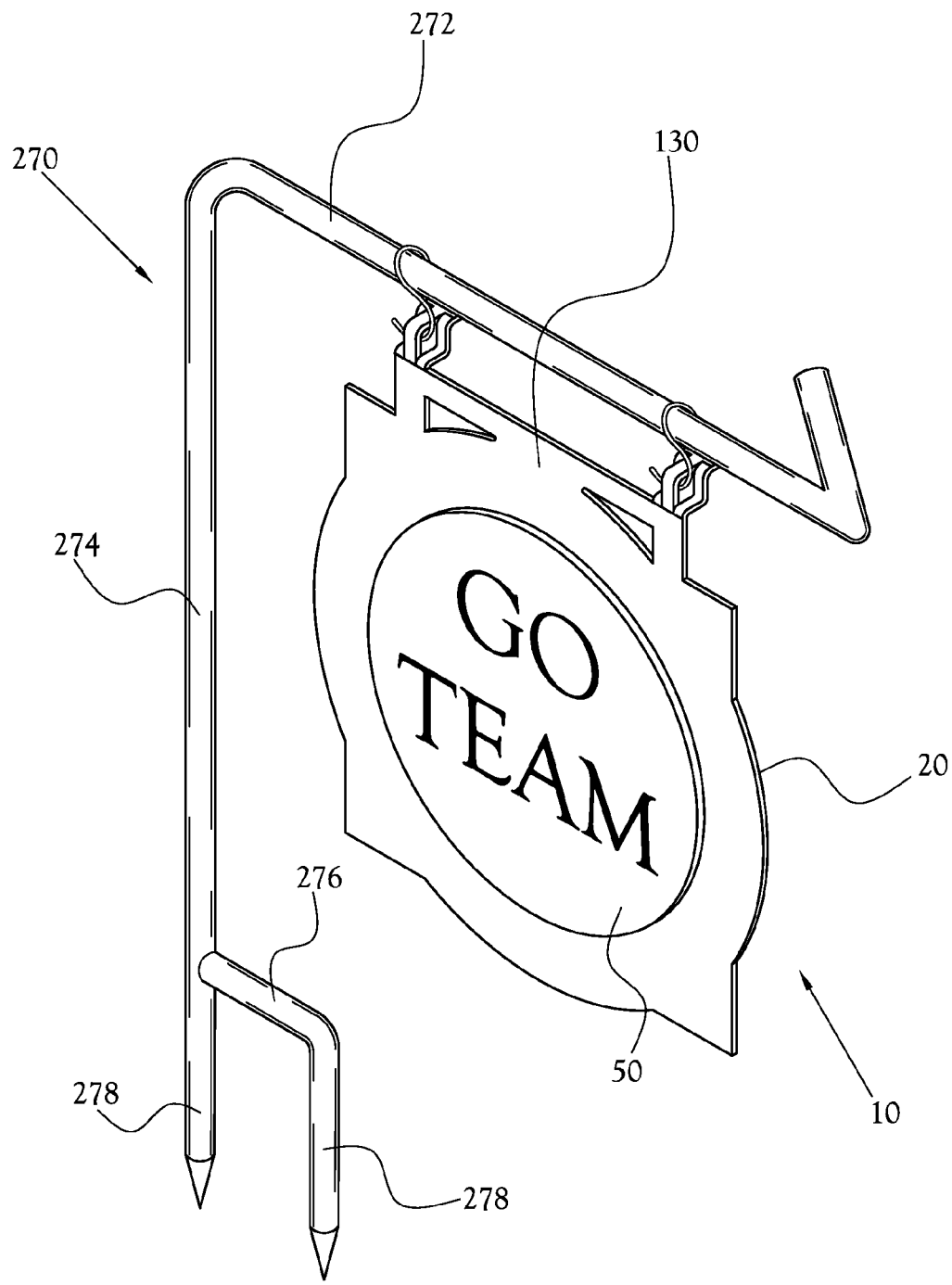
FIGS. 19A, 19B, and 19C illustrate a magnetic sign holder system including an alternate embodiment mounting frame, in various configurations, according to another example embodiment of the present general inventive concept.
Figure 19C:
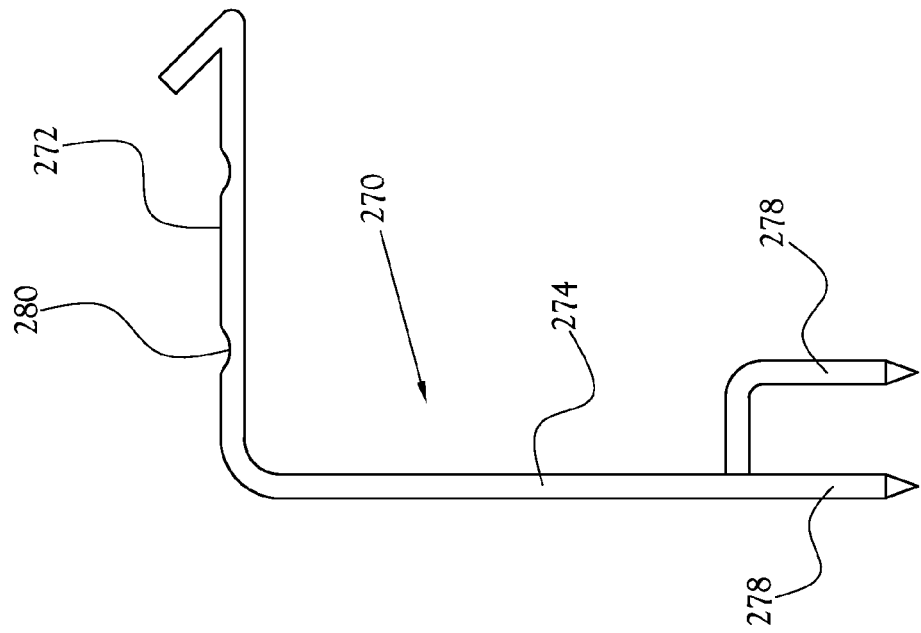
Figure 19B:
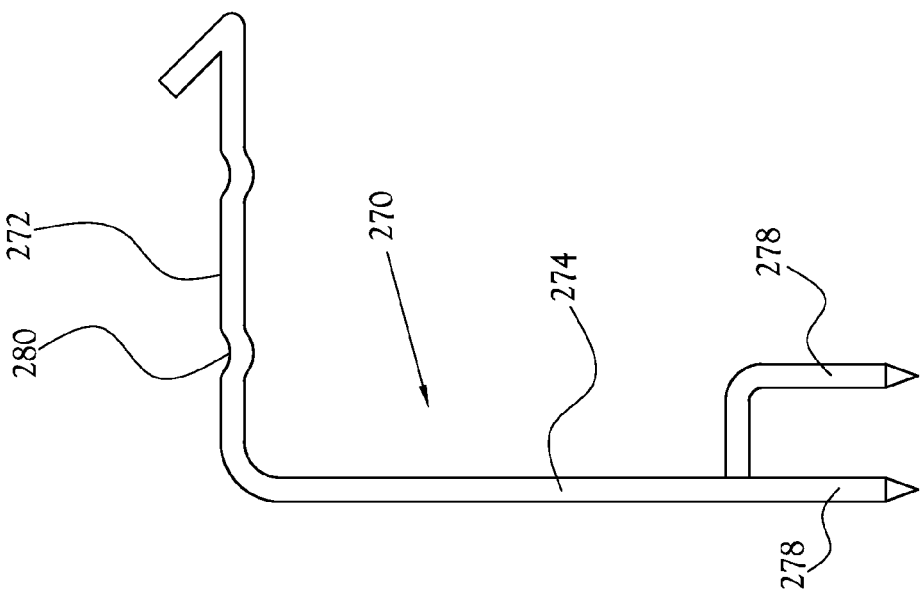

FIGS. 19A, 19B, and 19C illustrate a magnetic sign holder system including an alternate embodiment mounting frame according to another example embodiment of the present general inventive concept. The magnetic sign holder system in this example embodiment includes a magnetic sign holder 10 coupled to a mounting frame 270 in a similar fashion to the example embodiment illustrated in FIG. 8, but a top portion 272 of the mounting frame 270 illustrated in FIG. 17 is supported by a single side portion 274. By way of comparison to the rectilinear embodiment illustrated in FIG. 17, mounting frame 270 has a cylindrical form with filleted corners. Such a configuration may provide a more desirable appearance to some users. In order to prevent migration of magnetic sign holder 10 along the top portion 272, at least one groove member 280 is disposed along the top portion 272 for receiving at least one s-hook 87 as illustrated in FIG. 8. Those skilled in the art will recognize that groove member 280 can be provided by selectively bending a selected portion of top member 272, as illustrated in FIG. 19B, or by cutting (or grinding) a selected portion of top member 272, as illustrated in FIG. 19C. A base portion 276 may be provided at the bottom of the side portion 274 to provide a place for the user to step and apply force to drive one or more anchoring portions 278, such as spikes or the like, into the ground or other foundation on which the mounting frame 270 is being mounted. A plurality of the anchoring portions 278 may be provided so that the magnetic sign holder system does not move around an axis due to wind or other forces. Various other example embodiments may provide the one or more anchoring portions 278 directly to the bottom of the side portion 274, without the base portion 276 being provided. The anchoring portions 278 may be formed of the same material as the mounting frame 270, and may be formed integrally as part of the mounting frame 270. In other various example embodiments, the anchoring portions 278 may be formed of a different material and/or attached to the mounting frame 270. In still other various example embodiments, the single side portion 274 may simply be provided with an angled end such as those provided to the example embodiment illustrated in FIG. 8.

According to various embodiments of the present general inventive concept, a magnetic sign holder on which one or more magnetic signs may be accommodated and readily exchanged, and which may be easily attached to different types of supporting members, is provided. According to various example embodiments, the magnetic sign holder may include a substantially flat accommodating portion formed of a ferromagnetic material to accommodate the magnetic sign, and one or more mounting brackets extending from one or more sides of the accommodating portion to affix the holder to a supporting member. According to other various example embodiments of the present general inventive concept, a magnetic sign holder system may include a mounting frame to which a magnetic sign may be coupled. According to other various example embodiments of the present general inventive concept, a method of producing a personalized magnetic sign may be provided by which a user may choose an image which is then affixed to a magnetic sign, such as by providing a digital version of the image to be printed on the magnetic sign. According to other various example embodiments, the magnetic sign may be provided with a transparent covering that may be illustrated and changed by the user, and may include adhesive indicia to further decorate the magnetic sign. According to other various example embodiments, the magnetic sign holder may be provided with one or more bracing members to help prevent twisting or other deformations of the sign holder.

It is noted that the simplified diagrams and drawings do not illustrate all the various connections and assemblies of the various components, however, those skilled in the art will understand how to implement such connections and assemblies, based on the illustrated components, figures, and descriptions provided herein, using sound engineering judgment.

Numerous variations, modifications, and additional embodiments are possible, and accordingly, all such variations, modifications, and embodiments are to be regarded as being within the spirit and scope of the present general inventive concept. For example, regardless of the content of any portion of this application, unless clearly specified to the contrary, there is no requirement for the inclusion in any claim herein or of any application claiming priority hereto of any particular described or illustrated activity or element, any particular sequence of such activities, or any particular interrelationship of such elements. Moreover, any activity can be repeated, any activity can be performed by multiple entities, and/or any element can be duplicated.

While the present general inventive concept has been illustrated by description of several example embodiments, it is not the intention of the applicant to restrict or in any way limit the scope of the inventive concept to such descriptions and illustrations. Instead, the descriptions, drawings, and claims herein are to be regarded as illustrative in nature, and not as restrictive, and additional embodiments will readily appear to those skilled in the art upon reading the above description and drawings.

The invention claimed is:

1. A magnetic sign holder comprising:

a substantially flat accommodating portion formed of a ferromagnetic material to accommodate a magnetic sign; and one or more mounting brackets extending from one or more sides of the accommodating portion to affix the magnetic sign holder to a supporting member;

wherein each of the mounting brackets comprises at least one through hole to receive a mounting screw;

each of the mounting brackets are bent approximately 90 degrees at a predetermined point between the accommodating portion and the through hole; and each of the mounting brackets include one or more notched portions at a location at which the mounting bracket is bent, the one or more notched portions being bent inwardly from the predetermined point having the approximately 90 degrees bend to receive a suspension member by which to hang the magnetic sign holder.

2. A magnetic sign holder comprising:

a substantially flat accommodating portion formed of a ferromagnetic material to accommodate a magnetic sign; and one or more mounting brackets extending from one or more sides of the accommodating portion to affix the magnetic sign holder to a supporting member, each of the mounting brackets being configured with at least one through hole to receive an attachment member to affix the magnetic sign holder to the supporting member;

wherein each of the mounting brackets are bent approximately 90 degrees at a predetermined point between the accommodating portion and the through hole; and each of the mounting brackets include one or more notched portions at a location at which the mounting bracket is bent, the one or more notched portions being bent inwardly from the predetermined point having the approximately 90 degrees bend to receive a suspension member by which to hang the magnetic sign holder.

* * * * *